United States Patent
Allen et al.

(10) Patent No.: US 9,565,191 B2
(45) Date of Patent: Feb. 7, 2017

(54) GLOBAL POLICY APPARATUS AND RELATED METHODS

(75) Inventors: Paul L. Allen, Redmond, WA (US); Michael W. Anderson, Bellevue, WA (US); David J. Finton, Issaquah, WA (US); Ming-Yuh Huang, Bellevue, WA (US); Charles T. Kitzmiller, Bellevue, WA (US); Phyllis Melvin, Seattle, WA (US); Stephen A. Ridlon, Issaquah, WA (US)

(73) Assignee: THE BOEING COMPANY, Chicago, IL (US)

( * ) Notice: Subject to any disclaimer, the term of this patent is extended or adjusted under 35 U.S.C. 154(b) by 1545 days.

(21) Appl. No.: 12/262,039

(22) Filed: Oct. 30, 2008

(65) Prior Publication Data

US 2009/0119746 A1 May 7, 2009

Related U.S. Application Data

(63) Continuation-in-part of application No. 11/209,985, filed on Aug. 23, 2005, now Pat. No. 7,921,452, and a continuation-in-part of application No. 11/209,987, filed on Aug. 23, 2005, now Pat. No. 8,056,114.

(51) Int. Cl.
*H04L 29/06* (2006.01)
*G06Q 10/10* (2012.01)

(52) U.S. Cl.
CPC ............. *H04L 63/102* (2013.01); *G06Q 10/10* (2013.01)

(58) Field of Classification Search
CPC ........ H04L 63/102; H04L 63/20; H04L 63/10; H04L 41/0893; G06Q 10/10; H04W 12/08

USPC ............................................................ 726/1
See application file for complete search history.

(56) References Cited

U.S. PATENT DOCUMENTS

| | | | |
|---|---|---|---|
| 2,958,179 A | 11/1960 | Wolfe at al. | |
| 6,023,765 A | 2/2000 | Kuhn | |
| 6,167,445 A * | 12/2000 | Gai et al. | 709/223 |
| 6,324,647 B1 | 11/2001 | Bowman-Amuah | |
| 6,466,932 B1 * | 10/2002 | Dennis et al. | 710/33 |
| 6,484,261 B1 * | 11/2002 | Wiegel | 726/11 |
| 6,640,307 B2 | 10/2003 | Viets et al. | |
| 7,340,469 B1 | 3/2008 | Alghathbar et al. | 707/10 |
| 8,191,044 B1 * | 5/2012 | Berlik et al. | 717/124 |
| 2001/0039576 A1 * | 11/2001 | Kanada | 709/223 |

(Continued)

FOREIGN PATENT DOCUMENTS

| WO | WO 01/33349 A2 | 5/2001 |
|---|---|---|
| WO | WO 02/101975 A1 | 12/2002 |
| WO | WO 2005/009003 A1 | 1/2005 |

OTHER PUBLICATIONS

Adda et al., MceTech, Jan. 19, 2005.

(Continued)

*Primary Examiner* — Yogesh Paliwal
(74) *Attorney, Agent, or Firm* — Patterson + Sheridan, LLP

(57) ABSTRACT

A method of implementing requirements applicable to systems of an enterprise includes modeling the requirements as contents of policies applicable to target domains of the enterprise. The policy contents are integrated into a policy model. The policy model is adapted to obtain representations of domain-specific requirements corresponding to target systems in the target domains. The representations are integrated with the corresponding target systems to implement the domain-specific requirements.

17 Claims, 7 Drawing Sheets

(56) References Cited

U.S. PATENT DOCUMENTS

| | | | |
|---|---|---|---|
| 2002/0002577 A1 | 1/2002 | Garg et al. | 709/104 |
| 2002/0188513 A1* | 12/2002 | Gil et al. | 705/22 |
| 2003/0120935 A1* | 6/2003 | Teal et al. | 713/188 |
| 2003/0126464 A1* | 7/2003 | McDaniel et al. | 713/201 |
| 2003/0204619 A1* | 10/2003 | Bays | 709/238 |
| 2004/0093518 A1 | 5/2004 | Feng et al. | |
| 2004/0193909 A1 | 9/2004 | Chang et al. | |
| 2005/0166260 A1 | 7/2005 | Betts et al. | |
| 2005/0257244 A1* | 11/2005 | Joly et al. | 726/1 |
| 2006/0090131 A1 | 4/2006 | Kumagai | |
| 2006/0190997 A1* | 8/2006 | Mahajani et al. | 726/10 |

OTHER PUBLICATIONS

Hannover at al., Rule-based Policy Specification: State of the Art and Future Work, 2004.
Damianou at al., A Survey of Policy Specification Approaches, Apr. 2002.
XACML, Aug. 23, 2005.
Hassan, Process based governance using Policies.
Unified Modeling Language, Aug. 23, 2005.
Ray et al., Using UML to Visualize Role-Based Access Control Constraints, 2004.
IBM Rational Software Modeler, Oct. 2004.
Ferraiolo et al., Role Based Access Control, Aug. 23, 2005.
White Papers and Business Guides, Aug. 23, 2005.
Acevedo et al., Enterprise Security Applications of Partition Rule Based Access Control (PRBAC), Aug. 23, 2005.
Manish Verma, XML Security: Control information access with XACML, Aug. 23, 2005.
Johnson, M. et al., KAoS Semantic Policy and Domain Services: An Application of DAML to Web Services-Based Grid Architectures; Proceedings of the AAMAS 03 Workshop on Web Services and Agent-Based Engineering; Melbourne, Australia; 2003.
Suri, N., et al., DAML-based Policy Enforcement for Semantic Data Transformation and Filtering in Multi-agent Systems; Proceedings of the Autonomous Agents and Multi-Agent Systems Conference (AAMAS 2003); Melbourne, Australia; New York, NY: ACM Press; 2003.
Tonti, G., et al., Semantic Web Languages for Policy Representation and Reasoning: A Comparison of KAoS, Rei, and Ponder; Submitted to the International Semantic Web Conference (ISWC 03); Sanibel Island, Florida; 2003.
Uszok, A., et al., KAoS Policy and Domain Services: Toward a Description-Logic Approach to Policy Representation, Deconfliction, and Enforcement; Proceedings of Policy 2003; Como, Italy, in press; 2003.
Uszok, A., et al., Daml Reality Check: A Case Study of KAoS Domain and Policy Services; Submitted to the International Semantic Web Conference (ISWC 03); Sanibel Island, Florida; 2003.
Article on Mixed Radix; http://en.wikipedia.org/wiki/Mixed_radix; Feb. 10, 2009.
Vainstein, F., et al., Reduction in Space Complexity and Error Detection/Correction of a Fuzzy Controller; 2006.
Richardson, A., at al.; Variable-Radix Integrated Counter; Electronic Letters, Dec. 1966, vol. 2, Issue No. 12; pp. 448-449.

* cited by examiner

GLOBAL POLICY APPARATUS AND RELATED METHODS

CROSS-REFERENCE TO RELATED APPLICATIONS

This application is a continuation-in-part of U.S. patent application Ser. Nos. 11/209,985 and 11/209,987, both filed on Aug. 23, 2005. The entire disclosures of both of the above applications are incorporated herein by reference.

FIELD

The present disclosure relates generally to policies applicable to enterprise systems and more particularly (but not exclusively) to implementing policy requirements in one or more target domains of an enterprise.

BACKGROUND

The statements in this section merely provide background information related to the present disclosure and may not constitute prior art.

Computing systems, and the information and data within them, are typically governed by policy. For example, information assurance policies govern how information is protected, and shared, and its availability assured; quality of service (QoS) policies govern how computing resources are allocated for use; and network management policies govern how computing networks are deployed and administered. Each type of policy typically is specified in a separate protocol and is authored and maintained within a protocol-specific application.

SUMMARY

The present disclosure, in one implementation, is directed to a method of implementing requirements applicable to one or more systems of an enterprise. The method includes modeling the requirements as contents of policies applicable to one or more target domains of the enterprise. The policy contents are integrated into a policy model. The policy model is adapted to obtain one or more representations of domain-specific requirements corresponding to one or more target systems in one or more of the target domain(s). The representation(s) are integrated with the corresponding target systems to implement the domain-specific requirements.

In another implementation, the disclosure is directed to a method of implementing requirements applicable to one or more systems of an enterprise. The method includes capturing a plurality of requirements applicable to one or more target domains of the enterprise. Based on the captured requirements, components are developed for policies applicable to the target domain(s). The components are integrated to obtain a model of policies applicable to the target domain(s). The model is used to obtain a policy set applicable in one of the target domains. The policy set and an adapter meta-model are used to obtain one or more representations of the policy set specific to a target system of the one of the target domains. The representation(s) are used to implement the policy set relative to the target system.

In yet another implementation, the disclosure is directed to a apparatus for implementing requirements applicable to one or more systems of an enterprise. One or more processors and memory are configured to, in response to user input, provide a model of the requirements as contents of policies applicable to one or more target domains of the enterprise and integrate the policy contents into a policy model. The processor(s) and memory are further configured to, in response to user input, adapt the policy model to provide one or more representations of domain-specific requirements corresponding to one or more target systems in one or more of the target domain(s) and integrate the one or more representations with the corresponding target systems to implement the domain-specific requirements.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

Figure 1:
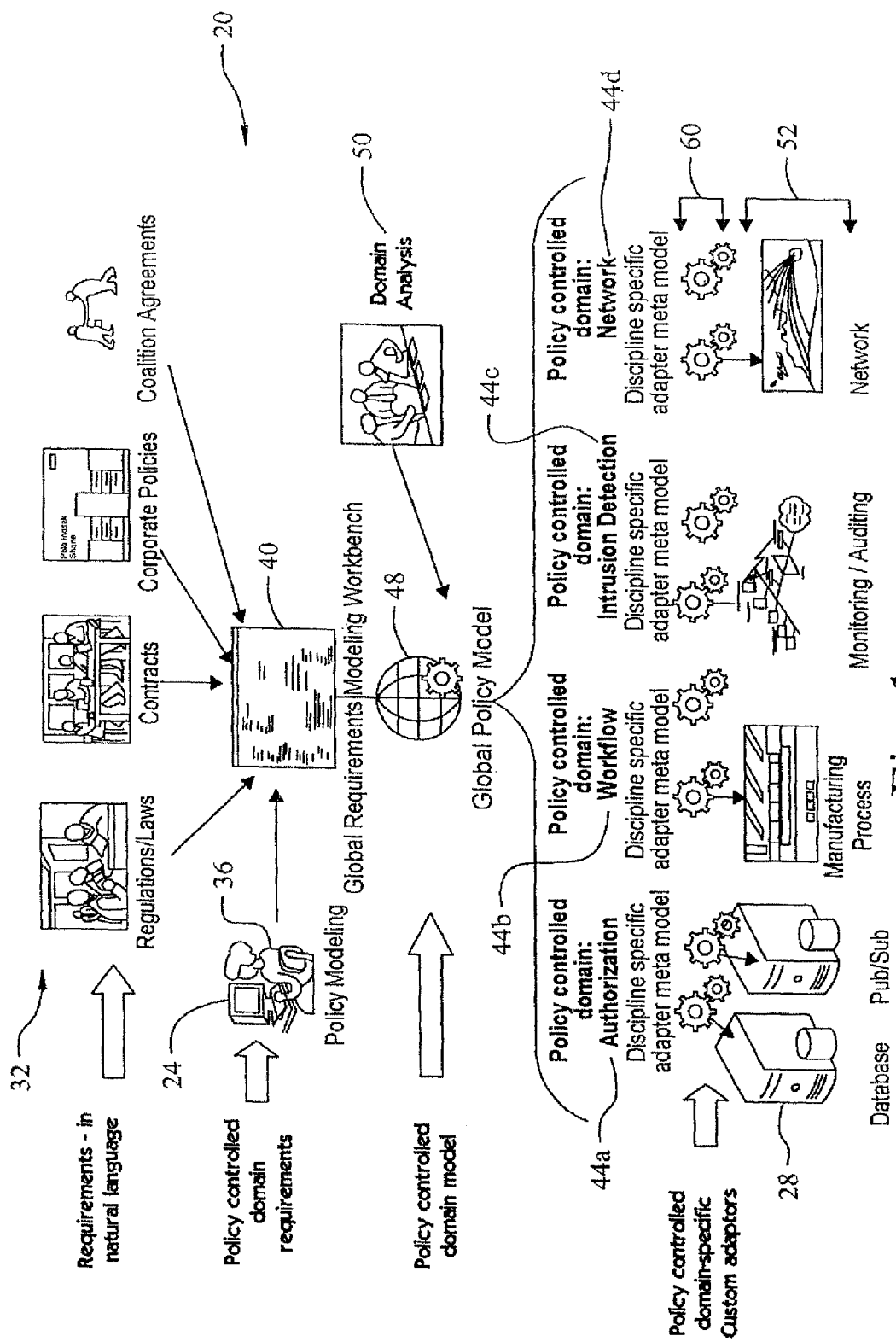
FIG. 1 is a conceptual diagram of an apparatus for implementing a global policy framework in accordance with one implementation of the disclosure.

The following description is merely exemplary in nature and is not intended to limit the present disclosure, application, or uses. It should be understood that throughout the drawings, corresponding reference numerals indicate like or corresponding parts and features.

The term "global" may be used in the disclosure and claims to refer to an apparatus, framework and/or model that can be implemented in connection with substantially any type of computing policy, including but not limited to information assurance policies, network management policies, quality of service policies, etc. Policies can be authored, analyzed for consistency and errors, and automatically adapted to substantially any type-specific implementation protocol, including but not limited to XACML (eXtensible Access Control Markup Language). Many different security components and/or sub-systems that make up a security infrastructure can be controlled by policies defined in a common interface and tool.

In various implementations of the disclosure, a global policy framework and apparatus provide an environment in which a user or group of users may author a set of consistent enterprise policies addressing, e.g., administrative, business, and/or regulatory requirements. The user(s) may adapt such policies to each protocol and application needed by systems, applications and networks used by an enterprise. Such policies and/or rules can also be linked back to the requirements.

A conceptual diagram of one implementation of an apparatus for implementing a global policy framework is indicated generally in FIG. 1 by reference number 20. The apparatus 20 includes a plurality of computers, processors and memory, etc. used, e.g., in a business enterprise system or system-of-systems (SoS). An exemplary computer 24 and servers 28 are shown in FIG. 1. It is highly probable, however, that additional computers, servers, memories, user interfaces, processors, etc. would be included in the apparatus 20 and distributed in the enterprise system.

The apparatus 20 and global policy framework are based on and include modifications to methods and apparatus described in co-pending U.S. patent application Ser. No. 11/209,985 entitled "Defining Consistent Access Control Policies" and U.S. patent application Ser. No. 11/209,987 entitled "Implementing Access Control Policies Across Dissimilar Access Control Platforms", filed Aug. 23, 2005, the disclosures of which are incorporated herein by reference in their entirety. The apparatus 20 may be used to implement requirements applicable to one or more systems of the enterprise. The requirements are modeled as contents of policies applicable to one or more target domains of the enterprise. The policy contents are integrated into a policy model. The policy model is adapted to obtain one or more representations of domain-specific requirements corresponding to one or more target systems in one or more of the target domain(s). The representation(s) are integrated with the corresponding target systems to implement the domain-specific requirements.

Referring again to FIG. 1, policy definition is begun by defining requirements indicated generally by reference number 32. Such requirements, typically in natural language, may be derived from one or more information repositories at the human level. In a large enterprise, e.g., a system-of-systems (SoS), a variety of sets of requirements are typically documented in information repositories. Requirements 32 could include policies in areas including but not limited to regulations and/or laws, business contracts, company policies, and coalition agreements.

One or more users 36, e.g., policy administrator(s) using a modeling workbench 40, capture the requirements 32 and develop policy-related components, e.g., attributes and actions, applicable to one or more target domains indicated collectively as 44, e.g., an authorization domain 44a, a workflow domain 44b, an intrusion detection domain 44c, and a network domain 44d. The policy-related components for the domain(s) 44 are integrated into a global policy model 48.

The model 48 may be subjected to analysis 50 for target domains. Analysis of a policy applicable in one target domain 44 may lead to the analyst defining a complementary policy in another domain. For example, where a policy in the authorization domain 44a prescribes that only certain individuals with certain roles may access a certain set of information, then the authorization can be associated with a complementary policy in the intrusion detection domain 44c that informs an intrusion detection target system to monitor accesses by other roles on that same information set. Thus unauthorized access can be prevented and attempts to do so also can be identified and monitored.

The policy model 48 can be implemented to deploy policies to target systems 52 in the target domain(s) 44. In the authorization domain 44a a target system 52 may be, for example, a database and/or a network having a service-oriented architecture (SOA). In the workflow domain 44b, a target system 52 may implement workflow instructions for a manufacturing process. In an intrusion detection domain, a target system 52 may be one that monitors and logs access events in a network or other system. In a network domain, a target system 52 may be one that manages network quality of service (QoS). As further described below, various adapters 60 may be used to adapt policies described in the policy model 48 to obtain various representations of policy suitable for deployment to various target systems 52.

Figure 2A:
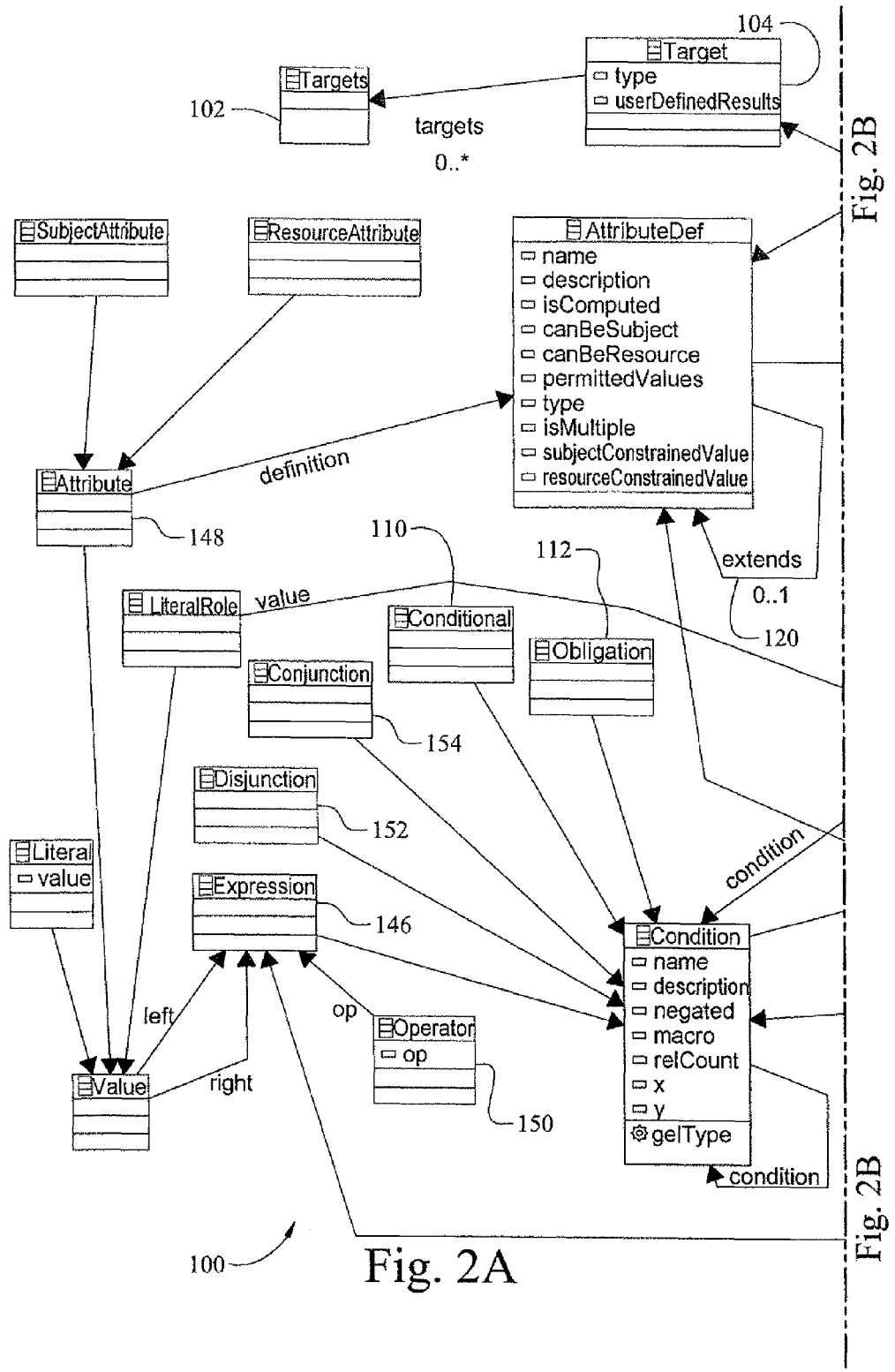
FIG. 2 is a diagram of a workbench domain requirements model in accordance with one implementation of the disclosure.
Figure 2B:
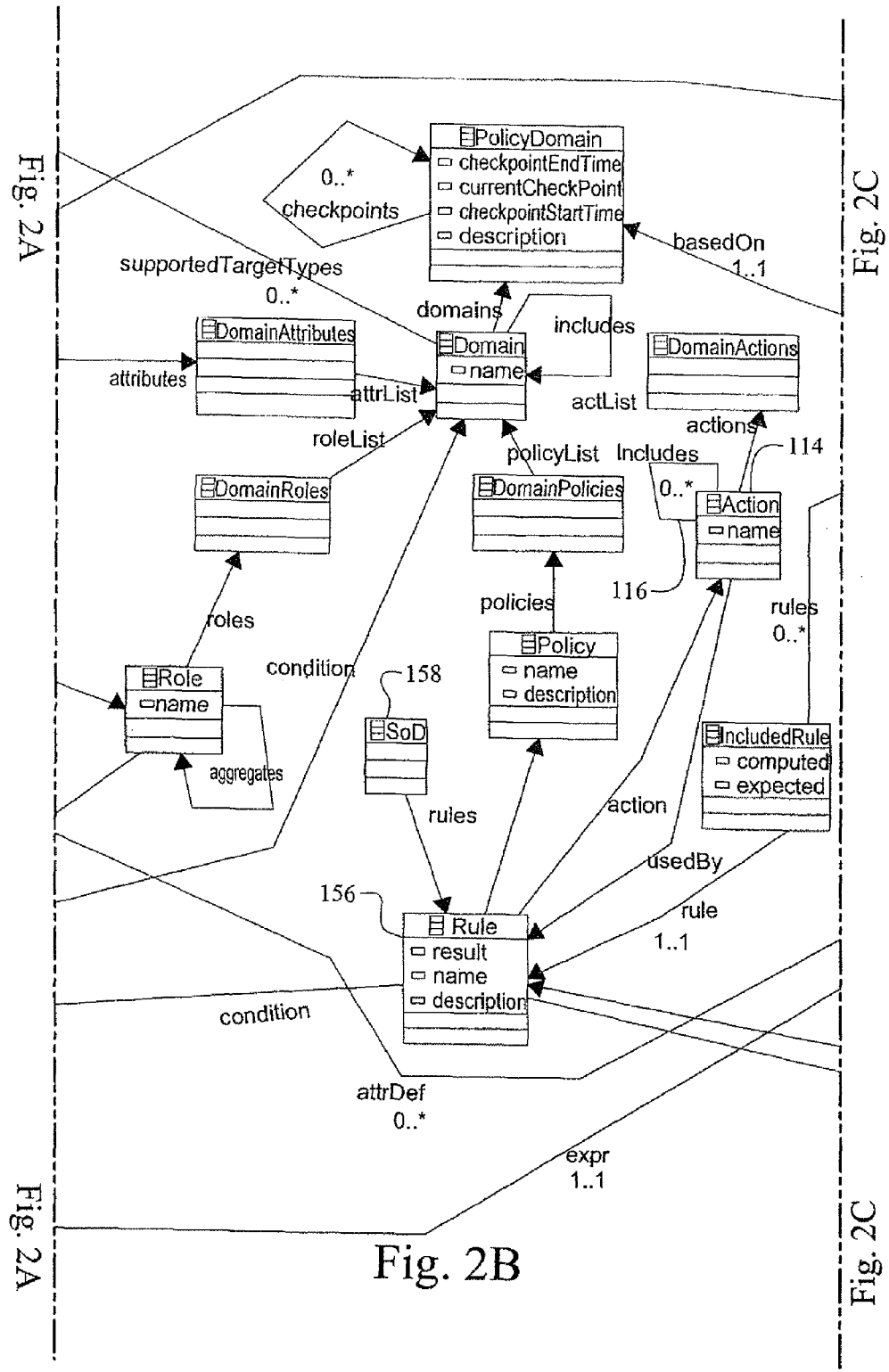
Figure 2C:
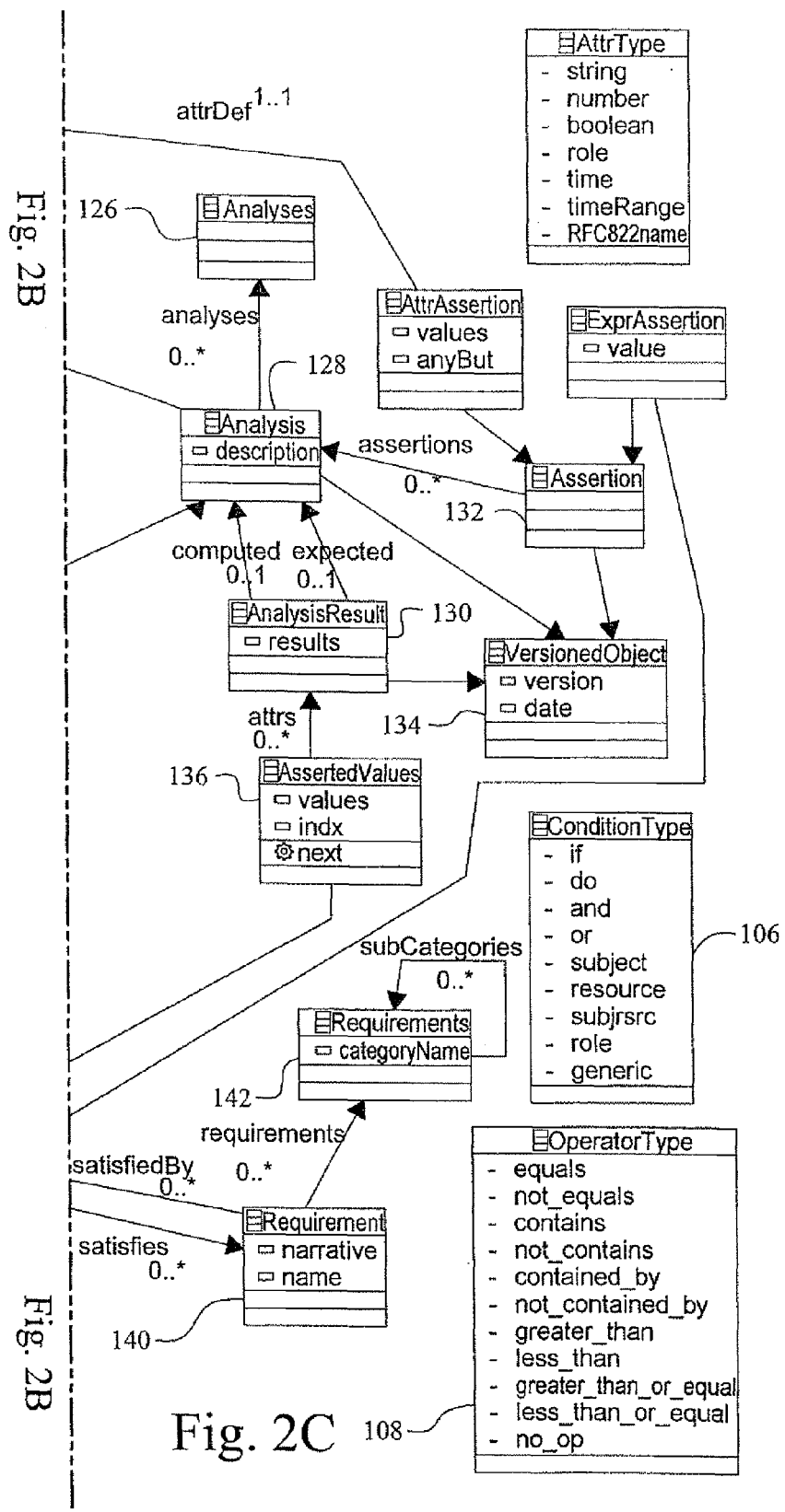

In some implementations, a Unified Modeling Language (UML) profile, i.e., a set of UML stereotypes, is defined to support modeling of the requirements 32. One example of a workbench domain model is indicated generally in FIG. 2 by reference number 100. The model 100 may be used to express policy requirements for one or more target domains 44. Targets and Target classes 102 and 104 represent information about target systems that are associated with a domain 44. A number of classes are provided in the model 100 to allow modeling of a plurality of types of requirements applicable in a domain 44. For example, Condition and Operator Types 106 and 108 and Conditional and Obligation classes 110 and 112 facilitate definition of, e.g., intrusion detection and quality of service policies. Actions 114 may aggregate other actions via an includes relation 116 so that an Action hierarchy may be constructed. An Action may include zero to many Actions, and included Actions may be an Action which itself includes other Actions. For example, a CRUD_actions Action could be defined to include individual create, read, update, and delete Actions. A document_management_actions Action could be defined to include the CRUD Action and other actions relevant to document management (e.g., copy, move).

Attributes may inherit values of another Attribute of the same type via an extends relation 120. For example, a color-palette Attribute could extend a multi-valued RGB-colors Attribute of type string, enabling it to add the values of the RGB-colors Attribute (i.e., red, green, and blue) to any "locally defined" values (e.g., cyan, magenta, and yellow). The resulting color-palette Attribute would be red, green, blue, cyan, magenta, and yellow. An Attribute automatically inherits any changes to any Attribute that it extends.

Rule results can be custom-defined, e.g., for the intrusion detection target domain 44c, instead of being restricted to either deny or permit. The model 100 also provides the ability to model obligations, that is, actions that must be performed by a target system when a rule "fires". Arithmetic expressions may also be provided in the workbench 40 to support quality of service (QoS) targets and various other targets.

A What-If Analysis framework is included in the workbench 40 to support what-if analyses. The What-If Analysis framework provides support for multiple What-if Analyses (via a versioning mechanism) and the persistence of analytical results for later recall, reporting, and comparison. The What-If Analysis framework includes a top-level object Analyses class 126 to collect analyses and an object Analysis class 128 to aggregate analysis-related information for an analysis. The Analysis class 128 aggregates object classes to persist the results of an analysis (AnalysisResults class 130) and the value(s) of each Attribute asserted by the user during an analysis (subclasses of an Assertion class 132). The AnalysisResults, Analysis, and Assertion classes are all subclasses of a VersionedObject class 134 enabling versioned instances of these classes to be created. An AssertedValues class 136 provides a means to quickly access each of the asserted values associated with an Analysis to improve performance of What-If Analysis.

A requirements traceability framework is included in the workbench 40. This framework enables end-users to document high-level textual requirements associated with a policy problem or domain and to associate requirements with policies modeled in the workbench 40. The requirements traceability framework provides a Requirement class 140 to document a requirement and a Requirements class 142 to assist in grouping, allocating, and managing sets of requirements.

What-if Analysis may be performed, e.g., to help an analyst to debug a policy model and to understand how changes to a policy model, e.g., changes to an Allow or Deny decision, affect authorization decisions. What-if Analysis can assist an analyst in determining the sensitivity of an authorization decision to changes in the model, and in determining why a set of Rules produces the decision that it does. What-If Analysis can help an analyst to identify critical modeling assumptions and important decision criteria. Alternative Rule sets can be compared, possibly leading to simplification or consolidation of Rules. Requirements can be established for validation and testing. What-If Analysis can also help an analyst to improve the robustness of a set of Policies or Rules.

What-if Analysis supports two major use cases. Assert-Value is a use case in which an analyst asserts the value of one or more Attributes, Expressions, Rules or Domains to assess how the element values affect the decision computed for a set of Rules (an arbitrary set of Rules, or an entire multi-domain policy model). Select-or-Exclude Element is a use case in which an analyst selects one or more Expressions, Rules, or Domain models to include, or exclude, in the evaluation of a multi-Domain model, multi-Policy model, or multi-Rule authorization model.

What-if Analysis can assist an analyst in determining how the decision of a set of Rules is affected by: (a) including or excluding a Rule in the evaluation of a set of Policies or Rules; (b) including or excluding an Expression in the evaluation of a set of Policies or Rules; (c) setting the result of an Expression or a disjunction/conjunction of Expressions to TRUE or FALSE; (d) setting the Result of a Rule to TRUE or FALSE; (e) setting the value(s) of an Attribute or set of Attributes to a value or values; and/or (f) setting the decision of a domain to TRUE/FALSE or Allow/Deny to aid in the evaluation of combined Domains.

Policy authors may introduce errors and inconsistencies in policies, with the result that target systems using the policies might not correctly control access to information and capabilities. In a system with many complex policies it can be extremely difficult to identify and correct all such errors. A Checker capability may be used to test policy rules to determine whether they are well-formed and free of anomalies. The Checker can alert an administrator to errors, inconsistencies, and anomalies in a current policy model by creating a list of problem markers. Each problem marker indicates the problem type and its location, and allows the administrator to navigate to the rule containing the problem by a single click. The Checker can run continuously during policy creation, so that errors may be immediately detected and corrected.

The Checker may test the elements of each Rule to make sure that they are populated with values that satisfy Rule syntax. In addition, the Checker may examine Expressions 146 for mismatches between Attributes 148 and between Attributes and Operators 150. The Checker may detect pairs of Expressions 146 that are redundant, as well as combinations of Expressions that render a Disjunction 152 or Conjunction 154 trivially True or False—for example, "AND (Country equals USA, Country does not equal USA)".

The Checker may compare pairs of Rules 156 in order to find semantic problems such as redundant Rules, conflicting Rules, and Rules that violate a Separation-of-Duties 158 constraint. The Checker also may detect Rules 156 that generalize other Rules, and Rules 156 with exactly-opposite conditional logic. The Checker may expand sets of literal elements and hierarchical Role Attributes. The Checker also may accommodate Obligations, user-defined Results, arithmetic expressions, aggregated Actions, and inherited Attribute values. The Checker then converts the logic of each Rule into Disjunctive Normal Form (DNF), as a two-level tree of Expressions (an OR of ANDs).

The Checker compares Disjunctions, Conjunctions, and whole Rules by first expressing them in its internal DNF representation, and then comparing the truth-tables for these logical formulas. Truth-table comparison amounts to testing whether a pair of logical formulas agree or disagree at every possible combination of input values, As the number of inputs increases, the number of cases to consider grows exponentially. For small numbers of inputs (less than 8), Karnaugh mapping can be used to minimize these Boolean functions. For larger problems, the Quine-McCluskey algorithm provides a more efficient method of doing substantially the same thing. One technique is to iterate through the possible input configurations and maintain a set of flags that record such facts as whether either Boolean formula produced the value True, and whether the first formula was ever True while the second one was False. This strategy is similar to the action of the Unix command "cmp." The cmp command very quickly compares two files and simply tells whether they differ. Since this analysis only needs to perform an element-by-element comparison for equality, it can be very fast, even for comparatively large files.

To iterate through a set of input configurations, the Checker may treat each combination of Attribute values as a variable-base number: each Attribute corresponds to a particular digit in the number, where the values of a particular digit are the permitted values for that Attribute One can easily "count through" these numbers by continually "incrementing" the right-most "digit," and treating an addition to the "biggest" value as a reset of that digit, with a "carry" into the digit to the left. Each of these variable-base numbers describes a unique configuration of Attribute values.

In order to "count-through" Attribute combinations, the Checker uses a set of permitted values for each Attribute. Most Attributes are defined with an explicit set of permitted values, but some may be left undefined. To include these Attributes in a truth-table analysis, one can create for them sets of permitted values that contain all values named in the Rules, as well as sufficient other values to guarantee that one can detect any differences between the truth-tables. The Checker thus may detect anomalies between pairs of Rules, as well as perform "what-if" analysis. The difference between the two applications is that in "what-if" analysis, a user may try out hypothetical changes to the permitted values, and the results can be examined by the Checker to show how the policy results depend on the Attributes and Rules.

As previously mentioned, the global policy model 48 can be implemented to deploy policies to target systems 52 in the target domain(s) 44. More specifically, a domain-specific policy set can be generated from the policy model 48, e.g., in a Universal Authorization Language (UAL) as described in U.S. patent application Ser. Nos. 11/209,985 and 11/209,987 and as may be modified in accordance with the present disclosure. It should be noted that other languages could additionally or alternatively be used to generate a policy set. Domain-specific adapters 60, which may or may not be plug-in, are used to adapt policy sets into formats useful in policy target systems 52. In various implementations, adapters 60 include discipline-specific adapter meta-models.

In various configurations the workbench 40 includes a built-in adapter 60 for publishing policy sets such as authorization policies in XACML (eXtensible Access Control Markup Language). In one implementation, XACML-formatted policies may be published to a SUN Open Source Policy Engine. In another implementation, XACML-formatted policies may be published to a COTS product such as Enterprise Policy Manager (EPM) from Cisco Systems, Inc. XML formats could also be used for policy publication, e.g., in an intrusion detection domain. Additional or alternative adapters are described in U.S. patent application Ser. No. 11/209,987.

It will be appreciated by those knowledgeable in the art that policies may vary in form dependent on a target domain and/or target system in relation to which the policies are to be implemented. For example, intrusion detection involves the placing of sensors throughout an infrastructure that monitor a network and may capture large quantities of data which can then be analyzed and visualized for anomalous or hostile behavior. Policies relevant to intrusion detection and visualization are likely to invoke monitoring activities and then state what to do if something is detected. Thus, notionally, the form of such policies may be "(IF something, Then DO something". This form is different from that, e.g. of a typical authorization domain policy, which may define "who can access what". The apparatus 20 can be used to integrate policies from different domains into the same policy model. Further, in various implementations, the apparatus 20 can be used to implement policies in different domains in the same environment.

Figure 3:
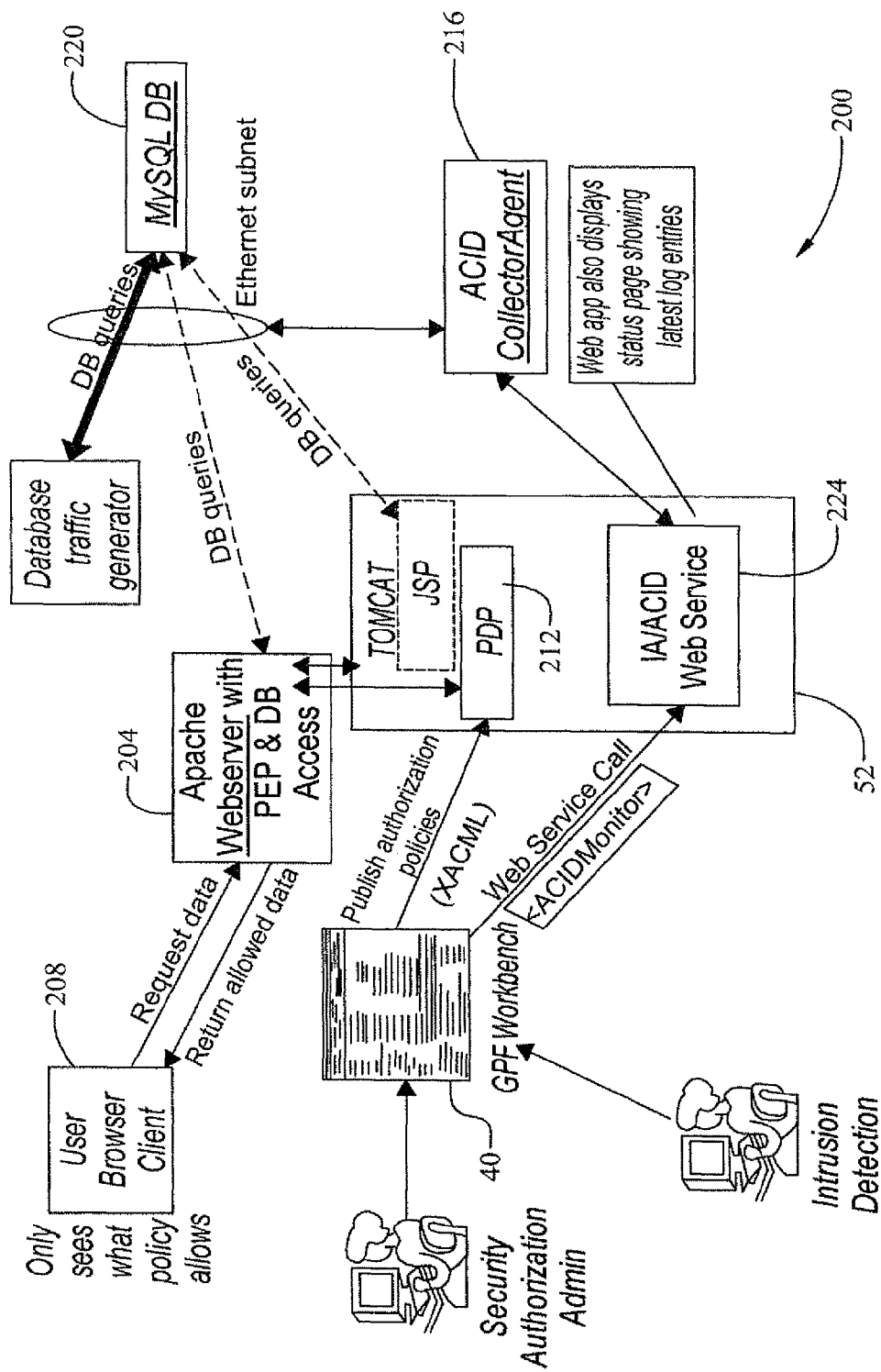
FIG. 3 is a diagram of an environment in which both authorization and intrusion detection policies are implemented in accordance with one implementation of the disclosure.

A diagram of an exemplary environment in which both authorization and intrusion detection policies are implemented is indicated generally in FIG. 3 by reference number 200. A PEP (Policy Enforcement Point)-enabled Apache web server 204 receives requests from a user browser client 208 and queries a PDP (Policy Decision Point) 212 included in a target system 52. An ACID-JADE (Analysis Console for Intrusion Databases-Java Agent Development Framework) Agent 216 monitors queries to a database 220 and sends monitoring information to an information assurance (IA)/ACID web service 224 that logs and displays the monitoring information.

Policy administrators using the workbench 40 capture requirements for authorization and intrusion detection. The administrators develop policy components such as attributes and actions that define the authorization and intrusion detection domains. The administrators then formulate policies and/or rules that regulate those two domains and publish or provision authorization and intrusion detection systems with those policies and rules. In FIG. 3, authorization components include the PEP 204 and the PDP 212. Authorization policies are published, e.g., in XACML to the PDP 212. Intrusion detection components include the ACID-JADE Agent 216 and the web service 224. The intrusion detection policies and/or rules are published to the ACID Web service 224, which accordingly informs the ACID-JADE Agent 216 as to what the Agent should monitor and what to do with the results of its monitoring, e.g., to email someone or to log entries in a specific log file.

Figure 4:
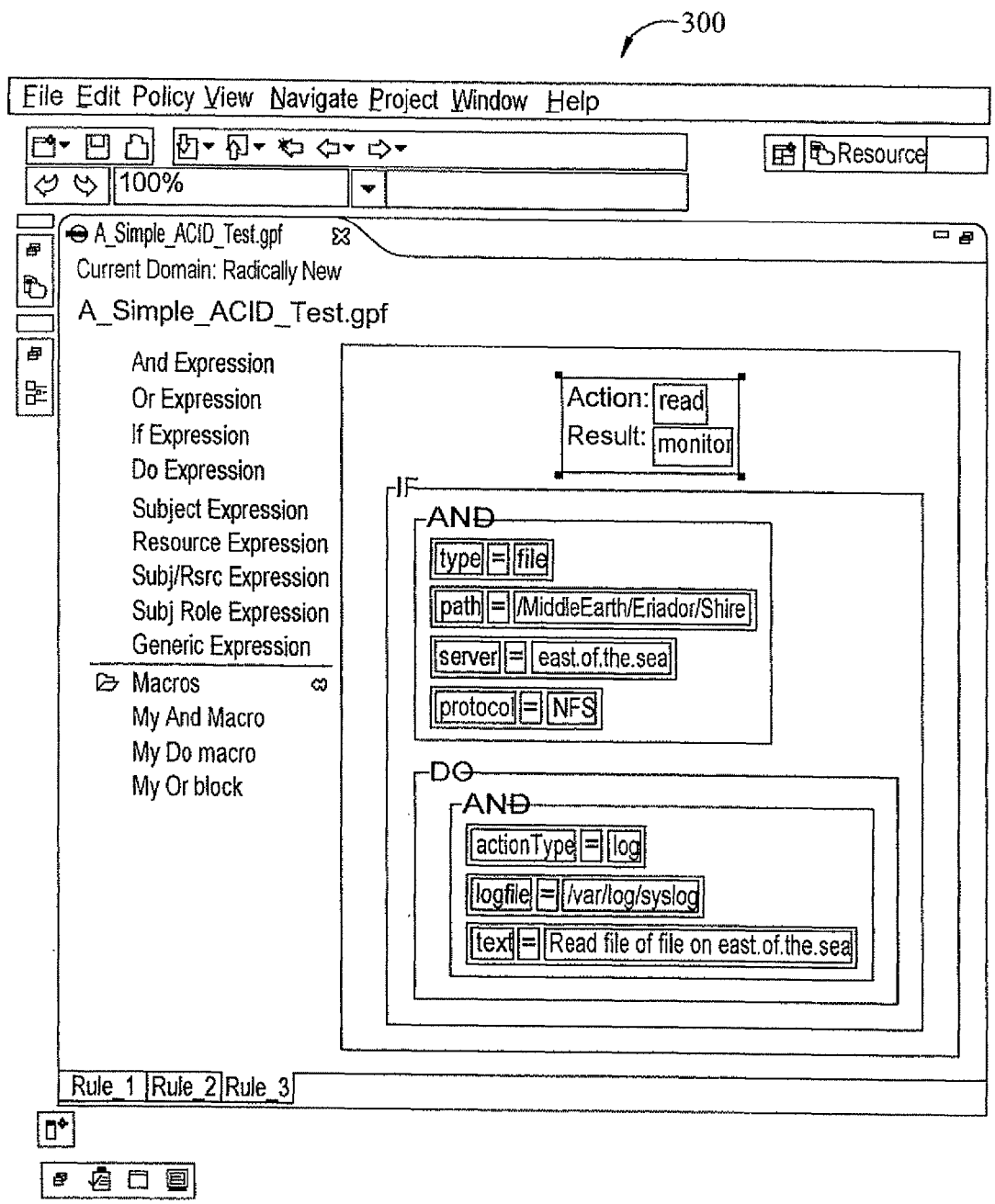
FIG. 4 illustrates a workbench screenshot of a rule associated with an intrusion detection domain in accordance with one implementation of the disclosure.

An exemplary workbench screenshot of a rule associated with intrusion detection is indicated generally in FIG. 4 by reference number 300. The rule 300 states that an intrusion detection system should monitor read access on a specific server (east.of.the.sea) for a specific protocol (NFS) for a specific path and then log these accesses into a specific log file (/var/log/syslog) with a certain descriptive text. Such rule(s) may be published from the workbench 40 to an underlying intrusion detection agent, e.g., the agent 216, in an XML format. A sample of such an XML formatted file follows.

```
<?xml version="1.0" encoding="ASCII"?>
<ACIDMonitor xmi:version="2.0"
xmlns:xmi="http://www.omg.org/XMI">
    <FileMonitor path="/MiddleEarth/Eriador/Shire" protocol="NFS"
server="east.of.the.sea">
        <LogAction logfile="/var/log/syslog" text="Read file of
file on east.of.the.sea"/>
    </FileMonitor>
</ACIDMonitor>
```

In the foregoing example, each information assurance component has its own vocabulary. The workbench 40 can accommodate such variances as it allows a user to define naming conventions in a domain aggregation and permits customizing adapters 60 to provision the underlying enforcement systems.

Many components of a computing infrastructure can benefit from policy-based controls. Among these are workflow-based applications, quality of service (QOS) components, network components, etc. As in the case of information assurance components, it can be advantageous to use a policy-based approach for such other components, e.g., to achieve more consistent and dynamic capabilities. Thus, e.g., as an enterprise experiences changes in its goals, policies, and objectives, it can implement such changes in an orderly, controlled, and timely fashion without time consuming administration or programmatic changes.

Figure 5:
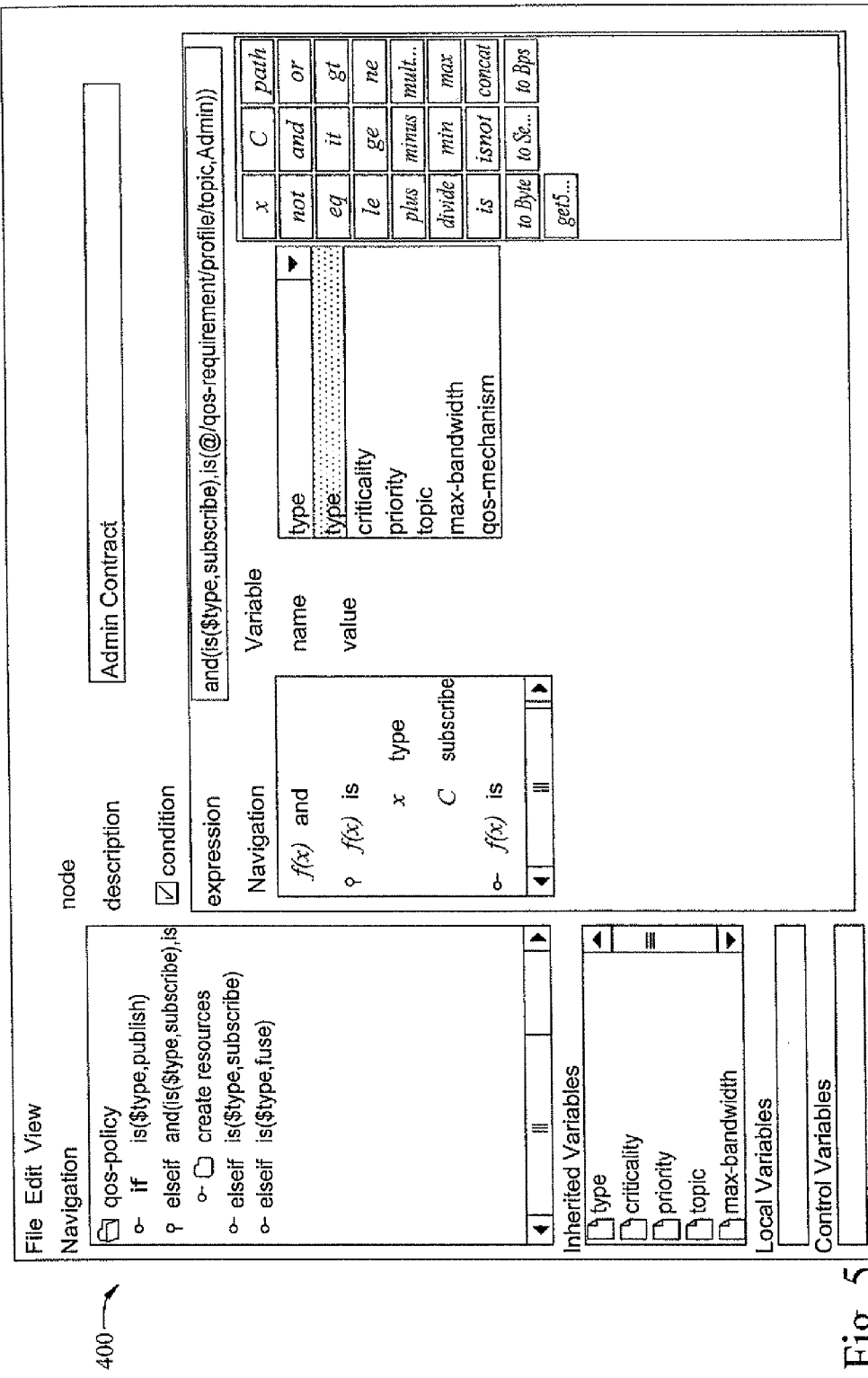
FIG. 5 illustrates a workbench screenshot of a policy/rule associated with a network Quality of Service (QoS) domain in accordance with one implementation of the disclosure.

An exemplary workbench screenshot of a policy/rule associated with a Quality of Service (QoS) domain is indicated generally in FIG. 5 by reference number 400. As shown in FIG. 5, attributes/variables associated with QoS are criticality, priority, max-bandwidth, etc. and the expressions are of the form "and", "if", "elseif", and "do".

The broad context of policies and the modeling tool provided in various implementations of the disclosure can enable business units and programs to capture security requirements and develop policies in a consistent manner that promotes better integration and control of security controls than is available through existing methods. In most current systems, each type of policy typically is specified in a separate protocol and is authored and maintained within a protocol-specific application, even where the aggregate set of policies is subject to the same enterprise requirements. As a result, many administrative tools must be used to administer the applications and networks used by an enterprise. In contrast, the integration of security requirements in accordance with various implementations of the disclosure can promote "defense in depth" requirements for enterprises and governmental entities as security components are able to enforce a more cohesive and consistent set of policies than previously possible.

The foregoing framework provides an application- and protocol-agnostic environment in which a set of policies can be authored and verified prior to being adapted to the application-specific protocols needed by existing enterprise administrative tools and systems. It also permits capture and linking of requirements to policies. The framework leverages an unique internal representation of policies, policy requirements, and target environments that facilitates policy inspection, policy analysis, and the automatic, correct adaptation of policies to application-specific protocols. The framework can be readily adapted to support new application-specific protocols via an extensible target environment modeling capability.

The foregoing framework provides a means to analyze and validate a set of policies prior to adapting the policies to multiple target applications, and to adapt this set of policies to multiple, diverse target systems. Policy definition is at a higher, more abstract level than existing systems, which rely on mappings between individuals and individual resources. Therefore there are fewer policies to control and administer. The foregoing framework also captures policies relevant, e.g., to a plurality of information assurance components and/or sub-systems such as authorization, intrusion detection, secure workflow, etc. It supports detailed policy examination, including consistency checking and "what if" analyses of the policies. The framework is less expensive than existing systems to administer and permits faster and more consistent and accurate changes to requirements.

While various embodiments have been described, those skilled in the art will recognize modifications or variations which might be made without departing from the present disclosure. The examples illustrate the various embodiments and are not intended to limit the present disclosure. Therefore, the description and claims should be interpreted liberally with only such limitation as is necessary in view of the pertinent prior art.

What is claimed is:

1. A method of implementing a global security policy of an enterprise, the method comprising:
   modeling a plurality of security policy rules, each providing a respective set of policy components applicable to a plurality of target domains of the enterprise;
   integrating the set of policy components into a single policy model representing the plurality of target domains, and wherein the single policy model represents a respective set of domain-specific requirements for each of the plurality of target domains;
   analyzing the single policy model to detect one or more problems amongst the plurality of security policy rules, further comprising:
   detecting syntax errors in the plurality of security policy rules;
   converting each of the plurality of rules into a respective Disjunctive Normal Form (DNF) representation;
   generating a truth-table from each of the DNF representations, wherein the truth-table includes one or more result values for each permutation of inputs for the respective DNF representation of the respective security policy rule; and
   comparing the generated truth-tables to identify one or more redundant rules within the plurality of rules;
   modifying the single policy model in real time, based on a result of an analysis of the single policy model;
   deploying the modified single policy model to a plurality of target computing systems within the target domains of the enterprise; and
   enforcing the domain-specific requirements represented by the modified single policy model on each of the plurality of target computing systems.

2. The method of claim 1, wherein the method of analyzing the single policy model further comprising:
   retrieving contents of the single policy model;
   identifying contents of at least one existing policy model; and
   verifying a consistency of the contents for the single policy model with the existing policy model.

3. The method of claim 1, wherein plurality of target domains include one or more of the following: authorization, workflow, intrusion detection, and network.

4. The method of claim 1, the deploying performed using an adapter meta-model specific to the one of the plurality of target computing systems.

5. The method of claim 1, wherein the plurality of target domains include workflow, and to implement the domain-specific requirements comprises to implement one or more policies involving workflow instructions for a manufacturing process.

6. The method of claim 1, wherein the plurality of target domains include authorization and intrusion detection, the method comprising:
   updating the policy model to obtain representations of requirements for authorization and representations of requirements for intrusion detection; and
   publishing the one or more updated policy model to one of the target systems to implement the authorization and intrusion detection requirements relative to the one of the target systems.

7. The method of claim 1, wherein the plurality of target domains further comprises:
   a first target domain specifying authorization policies for the enterprise;
   a second target domain specifying access control policies for the enterprise;
   a third target domain specifying network management policies for the enterprise; and
   a fourth target domain specifying network policies for the enterprise.

8. A non-transitory computer readable medium containing computer program code that, when executed by operation of one or more computer processors, performs an operation for of implementing a global security policy of an enterprise, the operation comprising:
   modeling a plurality of security policy rules, each providing a respective set of policy components applicable to a plurality of target domains of the enterprise;
   integrating the set of policy components to obtain a single policy model representing the plurality of target domains, and wherein the single policy model represents a respective set of domain-specific requirements for each of the plurality of target domains;
   analyzing the single policy model to detect one or more problems amongst the plurality of security policy rules, further comprising:
   detecting syntax errors in the plurality of security policy rules;
   converting each of the plurality of rules into a respective Disjunctive Normal Form (DNF) representation;
   generating a truth-table from each of the DNF representations, wherein the truth-table includes one or more result values for each permutation of inputs for the respective DNF representation of the respective security policy rule; and
   comparing the generated truth-tables to identify one or more redundant rules within the plurality of rules;
   modifying the single policy model in real time, based on a result of an analysis of the single policy model;
   deploying the modified single policy model to a plurality of target computing systems within the target domains of the enterprise; and
   enforcing the domain-specific requirements represented by the modified single policy model on each of the plurality of target computing systems.

9. The non-transitory computer readable medium of claim 8, the operation further comprising:
performing what-if analysis as to contents of the single policy model; and
based on the analysis, modifying the single policy model.

10. The non-transitory computer readable medium of claim 8, wherein the plurality of target domains include one or more of the following: authorization, workflow, intrusion detection, and a network.

11. The non-transitory computer readable medium of claim 8, wherein the domain-specific requirements further comprises to implement one or more policies involving quality of service (QoS).

12. An apparatus for implementing a global security policy of an enterprise, the apparatus comprising one or more processors and memory configured to, in response to user input:
provide a model of a plurality of security policy rules, each providing a respective set of policy components applicable to a plurality of target domains of the enterprise;
integrate the set of policy components into a single policy representing the plurality of target domains, and wherein the single policy model represents a respective set of domain-specific requirements for each of the plurality of target domains;
analyze the single policy model to detect one or more problems amongst the plurality of security policy rules, further comprising;
detecting syntax errors in the plurality of security policy rules;
convert each of the plurality of rules into a respective Disjunctive Normal Form (DNF) representation;
generate a truth-table from each of the DNF representations, wherein the truth-table includes one or more result values for each permutation of inputs for the respective DNF representation of the respective security policy rule; and
compare the generated truth-tables to identify one or more redundant rules within the plurality of rules;
modify the single policy model in real time, based on a result of an analysis of the single policy model;
deploy the modified single policy model to a plurality of target computing systems within the target domains of the enterprise; and
enforce the domain-specific requirements represented by the modified single policy model on each of the plurality of target computing systems.

13. The apparatus of claim 12, the apparatus further configured to, in response to user input, execute instructions for:
performing what-if analysis as to the security policy rules; and
based on the analysis, modifying the policy model.

14. The apparatus of claim 12, wherein the plurality of target domains include one or more of the following: authorization, workflow, intrusion detection, and network.

15. The apparatus of claim 12, further configured to use an adapter meta-model specific to the one of the plurality of target domains to update the single policy model.

16. The apparatus of claim 12, wherein the plurality of target domains include workflow, and to implement the domain-specific requirements comprises to implement one or more policies involving workflow instructions for a manufacturing process.

17. The apparatus of claim 12, wherein the plurality of target domains include authorization and intrusion detection, the apparatus further configured to:
update the policy model to obtain representations of requirements for authorization and representations of requirements for intrusion detection; and
publish the one or more updated policy model to one of the target systems to implement the authorization and intrusion detection requirements relative to the one of the target systems.

* * * * *

UNITED STATES PATENT AND TRADEMARK OFFICE
CERTIFICATE OF CORRECTION

PATENT NO. : 9,565,191 B2
APPLICATION NO. : 12/262039
DATED : February 7, 2017
INVENTOR(S) : Paul L. Allen et al.

It is certified that error appears in the above-identified patent and that said Letters Patent is hereby corrected as shown below:

In the Claims

In Column 10, Line 1, in Claim 3, after "wherein" insert -- the --.

In Column 10, Lines 35-36, in Claim 8, delete "for of" and insert -- for --, therefor.

In Column 11, Line 23, in Claim 12, before "representing" insert -- model --.

Signed and Sealed this
Twenty-fourth Day of April, 2018

Andrei Iancu
*Director of the United States Patent and Trademark Office*